L. MYERS.
Freight Car.
No. 48,830.
Patented July 18, 1865.
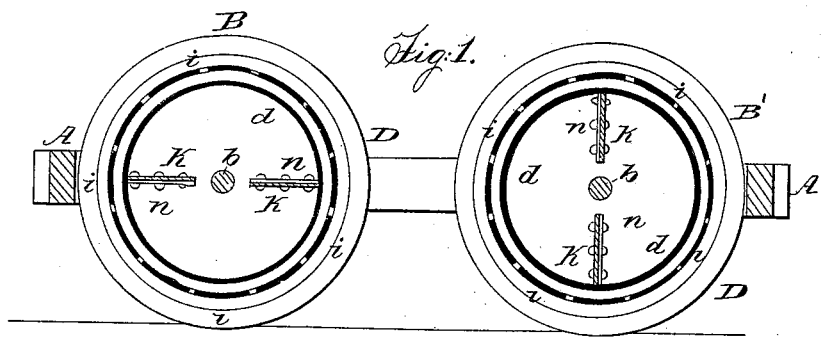
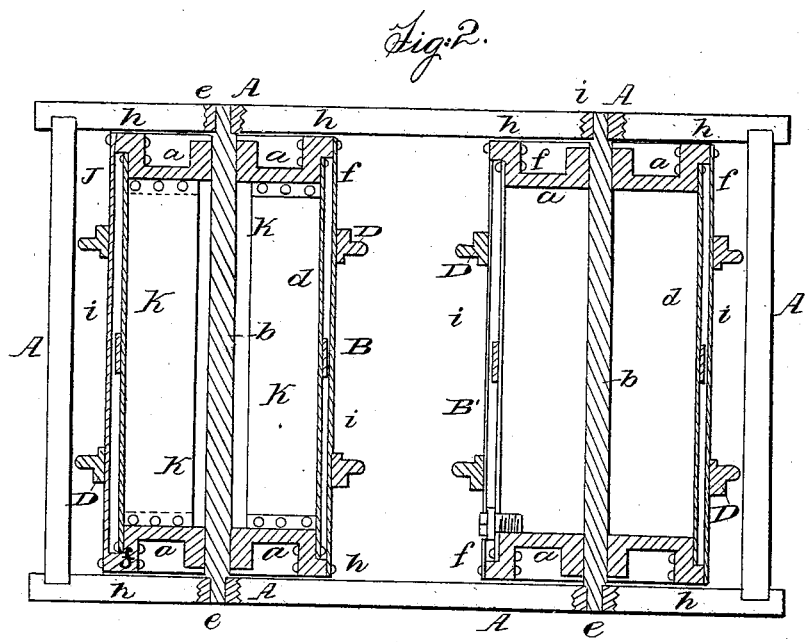
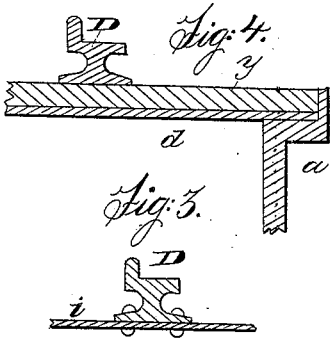
Witnesses.
Wm Albert Steel
John Parker
Inventor.
L. Myers
By his Atty
Henry Howson

UNITED STATES PATENT OFFICE.

LAURENCE MYERS, OF PHILADELPHIA, PENNSYLVANIA.

IMPROVEMENT IN FREIGHT-CARS.

Specification forming part of Letters Patent No. 48,830, dated July 18, 1865.

*To all whom it may concern:*

Be it known that I, LAURENCE MYERS, of Philadelphia, Pennsylvania, have invented certain Improvements in Cars for Transportation; and I do hereby declare the following to be a full, clear, and exact description of the same, reference being had to the accompanying drawings, and to the letters of reference marked thereon.

My invention relates to certain improvements in the car for transportation for which Letters Patent were granted to me June 24, 1851, and reissued March 21, 1865, the said car consisting of hollow cylindrical casing containing the load, directly to which casing tires adapted to the rails of the track were secured.

My improvement consists in interposing between the said cylindrical casing and the tires a yielding medium, the tendency of which is to absorb, or partly absorb, the shocks and strains to which the tires are subjected, and prevent the shocks from being communicated from the tires to the casing, which, being thus comparatively unaffected by the jars caused in traversing uneven rails, remains in a proper condition for containing and transporting petroleum.

In order to enable others skilled in the art to make and use my invention, I will now proceed to describe its construction and operation.

On reference to the accompanying drawings, which form a part of this specification, Figure 1 is a vertical section of my improved car; Fig. 2, a sectional plan; Fig. 3, a sectional view of part of one of the cylinders, showing a mode of securing the tires to the same; and Fig. 4, a modification of my invention.

A represents the frame of the car, and B and B' the two casings for the reception of petroleum or other material to be transported, the said casing being in the present instance cylindrical in form.

Each cylinder has two cast-iron ends, $a$, each end having a central hub, through which the axle $b$ passes, the said axle being driven or forced tight into the hub so as to form a secure joint. On each end of the axle is a journal, $e$, which turns in the frame, or in any suitable box secured thereto. The two ends $a$ are connected together by a cylindrical casing, $d$, of plate-iron, which is riveted to an annular flange, $f$, formed on each of the ends $a$. An annular projection, $h$, is formed on the flange $f$, and to this projection are riveted a series of longitudinal slats, $i$, of plate-iron, which are at a distance of an inch, or thereabout, from the casing $d$. To these slats are secured two tires, D, arranged at a distance apart from each other to suit the rails which the cars have to traverse.

In my aforesaid patent of June 24, 1851, the tires were secured direct to the cylindrical casing $d$, there being no yielding medium between the tires and the cylinder. Hence the latter was subjected to violent shocks and strains, which would in time impair it and render it leaky, and consequently useless as a vehicle for transporting petroleum. It will be evident that this evil is obviated by securing the tires to the longitudinal slats, which will yield to a limited extent, but sufficiently to absorb, or nearly absorb, the shocks to which the tires are subjected in traversing uneven rails.

In place of the longitudinal slats $i$, an entire cylindrical casing of plate-iron may be used, the iron being of such a thickness that it will yield readily to a limited extent and prevent the shocks to which the tires are subjected from being communicated in their full force to the casing.

Two partitions, $k\ k$, are secured to the interior of the cylinder, as shown in Fig. 2, the partitions being made of plate-iron and their ends secured to flanges $m$ cast on and forming a part of the ends $a$, the object of these partitions being to prevent the agitation of the contents of the cylinder, the said contents, owing to these partitions and to centrifugal force, revolving with and having no movement independent of the cylinder, as described in my aforesaid patent.

Strips of wood $y$, as seen in Fig. 4, may be interposed between the tires and the cylinder as a means of absorbing, or partly absorbing, the shocks communicated to the tires; but I prefer the entire cylindrical casing or the slats of plate-iron described above. The tires may be made and secured to the casing in the manner illustrated in Fig. 3. It will be understood that one end of such cylinder is provided with a suitable man-hole, through which access may be had to the interior, the said hole being provided with a suitable detachable cover, and that there is in the casing a suitable aperture or apertures through which the petroleum or other material may be admitted to and discharged from the interior, the aperture being provided with an appropriate screw-plug or its equivalent.

I claim as my invention and desire to secure by Letters Patent—

The casing $d$, in combination with the tires D and the intervening slats or cylindrical casing, or their equivalents, for the purpose specified.

In testimony whereof I have signed my name to this specification in the presence of two subscribing witnesses.

LAURENCE MYERS.

Witnesses:
HENRY HOWSON,
W. J. R. DELANY.